United States Patent [19]

Miura et al.

[11] Patent Number: 4,459,250
[45] Date of Patent: Jul. 10, 1984

[54] PROCESS AND APPARATUS OF EXTRUSION MOLDING RUBBERS AND THERMAL CROSS-LINKING SYNTHETIC RESINS

[76] Inventors: Takashi Miura; Isago Miura, both of 4-19, Honcho 1-chome, Asaka-shi, Saitama-ken; Kentaro Mori, No. 2889-98, Oaza-Dazaifu, Dazaifu-cho, Chikushi-gun, Fukuoka-ken, all of Japan

[21] Appl. No.: 172,070

[22] Filed: Jul. 14, 1980

[30] Foreign Application Priority Data

May 16, 1980 [JP] Japan ............................ 55-65691

[51] Int. Cl.³ .................................... H05B 3/60
[52] U.S. Cl. ........................... 264/27; 264/25; 264/45.9; 264/176 R; 264/236; 264/347; 264/DIG. 46; 264/DIG. 65; 425/174.6; 425/376 A; 425/379 R
[58] Field of Search ............ 264/176 R, 22, 25–27, 264/236, 45.9, 347, DIG. 46, DIG. 65; 425/174, 174.4, 174.6, 379 R, 376 A; 13/23, 20

[56] References Cited

U.S. PATENT DOCUMENTS

| | | |
|---|---|---|
| 3,095,608 | 7/1963 | Munsell ........................ 425/379 R |
| 3,335,460 | 8/1967 | Rádl .............................. 425/174.6 |
| 3,354,243 | 11/1967 | Dodge ............................... 264/25 |
| 3,354,250 | 11/1967 | Killoran ........................ 425/379 R |
| 3,469,012 | 9/1969 | Devaney ............................ 13/23 |
| 3,517,097 | 6/1970 | Mixell et al. .................... 264/347 |
| 3,576,933 | 4/1971 | Bates et al. ..................... 264/347 |
| 3,588,955 | 6/1971 | Azuma ........................ 425/379 R |
| 3,780,200 | 12/1973 | Maurer et al. ................. 425/174.6 |

FOREIGN PATENT DOCUMENTS 206522  9/1955  Australia .......................... 425/174

Primary Examiner—Jeffery R. Thurlow
Attorney, Agent, or Firm—Watts, Hoffmann, Fisher & Heinke Co.

[57] ABSTRACT

A process of extrusion molding plasticized vulcanizable or cross-linkable rubber or synthetic resin materials, comprising the steps of heating said materials to an elevated temperature in a short time immediately before a molding die and vulcanizing or cross-linking the materials in the manner of maintaining said elevated temperature substantially while the materials are passing through the die or for a while after they have passed through the die, thereby obtaining mold goods.

5 Claims, 6 Drawing Figures

PROCESS AND APPARATUS OF EXTRUSION MOLDING RUBBERS AND THERMAL CROSS-LINKING SYNTHETIC RESINS

BACKGROUND OF THE INVENTION (a) Field of the Invention

The present invention is mainly concerned with a process of extrusion molding a molding material comprising rubber, synthetic resin or the like which undergoes chemical changes caused by vulcanization or intermolecular cross-linkage when molded and an apparatus therefore.

In this connection, it is to be noted that the present invention will be explained with reference to the instance of rubber unless specially mentioned hereinafter.

(b) Description of the Prior Art

Extrusion molding of molding materials such as rubbers or thermal cross-linkable synthetic resins has hitherto been carried out commonly by employing a method comprising pressure feeding a plasticized material by means of a screw or a different type extruder, extruding goods molded in a desired shape through a die head attached to the tip of the extruder, and subjecting said molded goods to further heating and vulcanizing treatment in another place by means of a continuous vulcanizing apparatus or the like, thereby obtaining products. For the purpose of the aforesaid vulcanization after molding, it has been common to employ processes of hot-chamber type, drum type, long-tube type, liquid medium vulcanization type, high frequency vulcanization type and others. However, all these processes are defective in that they are comparatively large-scaled, consume high energies and additionally are expensive. Moreover, these processes call for wide areas for equipment and further involve no small numbers of difficult points to be solved in processing respectively.

Properly speaking, the vulcanizing phenomena of rubbers are promoted by thermal hysteresis wherein temperature and time are employed as parameters. The vulcanization velocity of rubbers at the time of molding vulcanization is sensitive to temperatures, for instance in case the temperature rises by 10° C. the time required for vulcanization is reduced to about ½ of that before the temperature rises. And, rubbers, once scorched, lose their previous plasticizability as well as fluidity to a non-reversible degree and become unable to flow. Moreover, rubbers are bad conductors to heat and should rather be said nearer to insulators. Although the values to be mentioned hereunder are variable in accordance with the percentages of components contained in the compounding rubber material, it is said that the heat conductivity of rubber is, for instance, 1/500 of that of iron, 1/5 of that of water and 6 times that of air. In this context, the specific heat of rubber is more than 4 times that of iron.

For the purpose of heating (inclusive of cooling) rubbers having properties as mentioned above by means of conventional extrusion molding machines, it has been common to employ a method comprising heating a molding material within a molding machine until it is fed to a die under an elevated pressure after it has passed through the respective sections of mixing by compression, softening by heating, transferring, etc., through a continuous structure comprising above mentioned sections. In other words, it is intended by the conventional heating method that a molding material temperature may be maintained, immediately before the die, at a predetermined temperature, for instance an optional fixed temperature in the range of 80°–130° C., by heating the molding material from the outer surface of the said structure wall with a heater placed thereon, said structure being made mainly of a thick steel material, or by heating (or cooling) the molding material in the manner of applying a heating medium having a suitable temperature into a heating medium passage provided in the wall of the structure, or by utilizing the frictional heat of the molding material per se in addition thereto.

Meantime, it can be seen from the aforesaid properties of rubbers that the purpose of vulcanizing the rubber material while it is molded within the die can be attained by feeding the rubber material to the die under an elevated pressure after the temperature of the rubber material to be extruded from the extrusion molding apparatus, for instance 80° C. has been further elevated to a high temperature capable of vulcanizing the rubber material in about 10 seconds, for instance 180° C. However, in view of the fact that the above mentioned conventional heating methods, as described above, rely mainly on the heat transfer using the thick steel-made structure as the medium and therefore it takes a considerably long period of time before the body to be heated, namely the rubber material, thermally responds to the heater, it is totally difficult for the conventional heating methods to achieve the above mentioned sharp rise in temperature immediately before the die as well as while preventing the material from scorching.

Further, in the case of extrusion molding, wherein molded goods are generally extruded continuously at a fixed speed, it is most preferable that thermal equilibrium is established between the heater and the object to be heated, resulting in a thermal stationary state that the temperature of the material passing through one point of the heating section can always (in terms of hour) be maintained unchanged against the fixed heating amount from the heater. Still further, even when said heating amount has been changed, it is necessary that the time required for the establishment of a new heat equilibrium therebetween should be as short as possible. Despite these requirements, however, the conventional heating methods unavoidably encounter with the trouble of unbalanced material temperatures because the heat capacity of the heating section is large as mentioned above and accordingly the log of thermal response is also large, whereby it takes a long period of time before heat equilibrium is established, during which there is caused the difference in how to be heated between the material heated by first passing through the heating section and that heated afterwards.

Still more further, it is impossible to completely eliminate the risk of an excess input even when regulating the heating amount in the stationary state as aforesaid. Once an excess heating input is generated, the material to be extruded from the die outlet after it has passed through the die is scorched and the scorched material can not pass through the obtacles in the way of the material's progress, for instance, such as mandrels, spiders or contractively modified sectional passage portions provided from the need of material velocity (pressure) distribution, whereby extrusion molding becomes impossible to continue. Therefore, the apparatus as a whole must be stopped and taken to parts for cleaning.

SUMMARY OF THE INVENTION

The object of the present invention is to elevate the temperature of material rubber sharply immediately before feeding of said material to a die so that the molded material may be vulcanized during its progress in the die, or to maintain molded goods at a high temperature substantially identical to that within said die for a while after said molded goods have passed through the die outlet for vulcanizing purposes, thereby achieving an integrated molding, vulcanizing operation.

For the purpose of solving the above mentioned usual problems the present invention has adopted the following measures. That is, the passage during which the material derived from the extruder is molded and extruded through the outlet provided at the tip of the die is divided into a part having a transformed rectangular sectional profile relative to the direction of flow of material and a part having a substantially changeless rectangular sectional profile (die land); a plurality of relatively narrow metallic resistance heating tubes which act as electric resistance materials or a plurality of heating passages each comprising a narrow slit-like contractive passage are provided therebetween; Joule heat is generated by applying electricity to the resistance heating tubes at their substantial both ends or by applying electricity to the resistance heaters disposed within said narrow slit-like passages; the Joule heat-generating heaters and the material passing through the above mentioned tubes or slit-like passages are contacted directly or through filmy thin layers, thereby heating the material to a high temperature sufficient to vulcanize it in a short time while holding a substantially continuous stationary state; the thus heated material is pressure fed from the outlets of above tubes disposed so as to open in the passage section of said die land or said slit-like passage outlet into the die land heated to a temperature substantially identical with the material temperature; and accordingly the material is allowed to be vulcanized while it is molded within the die land and then extruded or the molded goods are held at a high temperature substantially identical with that within said die for a while after it has left the die land outlet and thus vulcanized.

DESCRIPTION OF THE PREFERRED EMBODIMENTS

The embodiments of the present invention will be detailed hereinafter with reference to the attached drawings.

Figures 1, 2:
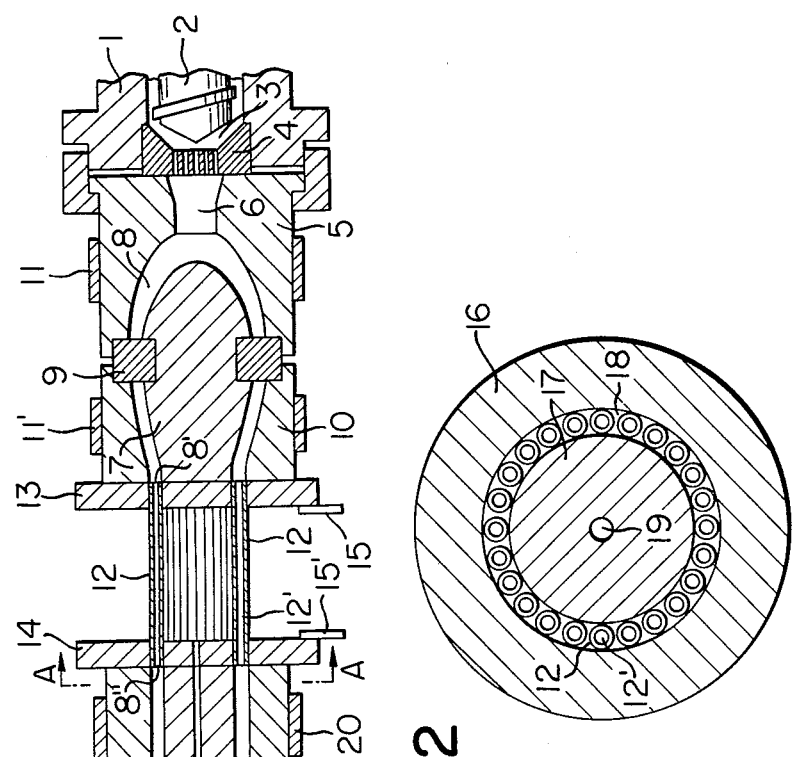
FIG. 1 is a sectional side elevation of the main part of the apparatus according to the present invention.
FIG. 2 is a sectional view taken on line A—A of FIG. 1.

FIG. 1 is a sectional view illustrating the main part of one embodiment of the extrusion apparatus for molding a hose having a circular section according to the present invention, wherein 1 denotes a cylindrical plasticizing cylinder inside of which is installed a rotary screw shaft 2 for mixing and transporting the material. Reference numeral 3 denotes a material passage formed within the plasticizing cylinder, 4 denotes a breaker plate, 5 denotes an adapter, 6 denotes a material passage formed within the adapter, 7 denotes a fore mandrel, 8 denotes a material passage modified as required, 8' denotes a heating passage inlet, 8" denotes a heating passage outlet, 9 denotes a spider, 10 denotes a fore die head, 11, 11' denotes a heater, 12 denotes a resistance heating tube, 12' denotes a heating passage, 13, 14 denotes a heating section board, 15, 15' denotes a connecting terminal, 16 denotes a land structure, 17 denotes a mandrel, 18 denotes a die land, 19 denotes an air hole, and 20, 20' denotes an electric heater. The fluid material passed through the breaker plate 4 flows from the material passage 6 formed within the adapter through the mandrel 7 and spider 9 into the passage 8 modified so as to impart a required velocity distribution and then reaches the heating passage inlet 8', during which the material is held at a scorch-free safety temperature range, for instance, at a fixed temperature in the range of 80°–130° C., by means of heaters 11 and 11'. As the resistance heating tube 12 there are utilized a plurality of relatively narrow tubes, which are made of nickel-chrome alloy, nickel-chrome-iron alloy, iron-carbon alloy, stainless steel or other metals and available for electric resistance material, in the manner of arranging one inlet of each of these plural tubes, namely the heating passage inlet 8' in confirmity with the sectional configuration of the passage 8 respectively and fixing it to the heating section board 13 thereby introducing the material fed from the passage 8 into the heating passage 12'. On the other hand, the heating passage outlet 8", as mentioned above, is arranged in conformity with the inlet sectional configuration of the die land and fixed to the heating section board 14 such that the material passing through the tube may be pressure fed into the die land passage. And, an outside pressure variable source is connected to the connection terminal 15, 15' to thereby generate Joule heat in the resistance heating tube 12 through which the material is passing, and the thus generated heat is utilized to heat the material passing through the heating tube 12, namely the heating passage 12' to an elevated temperature, for instance, in the range of 80°–180° C., during its passage through the heating passage 12', while maintaining the stationary state. The temperature such as 180° C. is a high temperature capable of vulcanizing the material, for instance in about 10 seconds, and therefore the high temperature material fed under a pressure into the die land 18 can reach a substantially vulcanized state while it is molded and extruded within the die land. The die land 18 is a passage which comprises the land structure 16 and the mandrel 17 and has a substantially changeless rectangular sectional configuration relative to the direction of flow of material. In this connection, when the rubber is insufficiently vulcanized even after it has passed through said die land, its vulcanization is completed by heating said rubber on the way extending from the die land outlet to a required distance so that the rubber may be maintained substantially at the high temperature as referred to above. A properly heated air may be blown into the air hole 19 so as to heat the mandrel 17, and when subjecting said insufficiently vulcanized rubber to further vulcanization, a hot air may be jetted from the end of the mandrel 17 to thereby heat cylindrical mold goods from within the mold good-containing tube. The resistance heating tube 12 may be, for instance, a stainless steel tube having an inside diameter of 1.0–1.5 mm and a thickness of about 0.15–0.2 mm, and the heating passage is formed by using 50–500 tubes. As the heating tube 12 there may be employed not only a circular tube but also a different shaped one as a matter of course. In addition thereto, it may be possible that a smaller caliber of tube is inserted into a larger caliber of tube, and the material is passed through the passage, namely the clearance created between the smaller caliber tube and the larger caliber tube, thereby heating the material to an elevated temperature as mentioned above. The electric power to be applied to the resistance heating tube 12 is normally a low-voltage and high-ampere one of about 3–8 V and 300–3000 A. Although this electric power apparently is excessive in relation to the resistance heating tube 12, since the material of fixed quantity is allowed to make forced convection within the heating tube for absorption of Joule heat generated therewithin, the quantity of heat added is substantially always equal to the quantity of heat absorbed. Therefore, even when there is necessity of regulating the heating input, thermal equilibrium is soon established in response to the change in heating input because the heat capacity of the heater is very small, which permits to carry out extrusion molding while holding the thermal stationary state.

FIG. 2 is an enlarged sectional view taken on line A—A of FIG. 1 seen in the direction of the arrow, which illustrates the outlet of each of the resistance heating tubes 12 disposed at substantially even intervals within the circular die land 18 defined between the land structure 16 and the mandrel 17. The material rubber heated to the above-mentioned elevated temperature after it has passed through the inside of the heating tube 12, namely the heating passage 12', even if scorched, can be injected into the die land, passed through the die land as it is scorched and injected to the outside. Accordingly, it is possible to regulate the heating input applied to the heating tube, while continuing the injection molding operation as usual, into a proper input, thereby obtaining suitably vulcanized mold goods.

Figure 3:
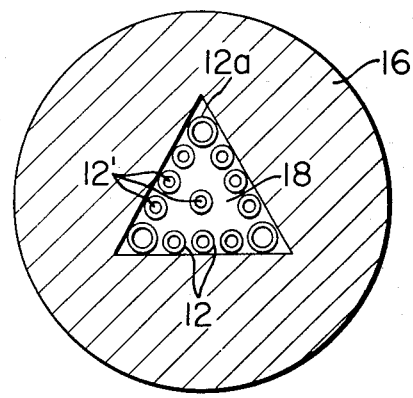
FIG. 3 is a sectional view similar to FIG. 2 of the modification of the apparatus according to the present invention.

FIG. 3 is a sectional view, similar to FIG. 2, of the die land of the same straight die as FIG. 1 for obtaining molding goods having a substantially regular triangle section. This die land 18 has a substantially regular triangle section and the outlet of the heating passage 12' is arranged in optional density within the said triangle area. As is evident from the drawing, furthermore, the heating passage lying near each apex of said triangle adopts the resistance heating tube 12a having a larger caliber. The reason why the aforesaid optional density and/or the tube having a different caliber is employed is to import desirable changes to the velocity (pressure) distribution of material.

Figure 4:
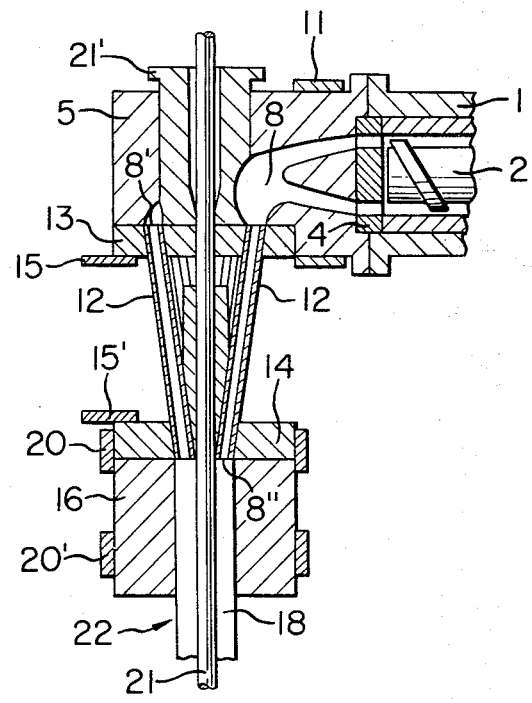
FIG. 4 is a sectional view of another embodiment of the apparatus according to the present invention.

FIG. 4 illustrates one embodiment of the cross head die different from the above mentioned, wherein the material, arrived at the inlet 8' of the heating passage after it has passed through the material passage 8 modified as required, is pressure injected into the resistance heating tube 12 and heated to an elevated temperature as mentioned above, then enters the die land 16 to coat a cable 21, and thereafter injected to the outside. Reference numeral 21' denotes a guide metal fitting for the cable 21, and 22 denotes the cable-coated rubber. The other members are like those already explained with reference to FIG. 1. Then, the like symbols will be affixed to the corresponding parts for the purpose of omitting detailed explanations thereon.

Figure 5:
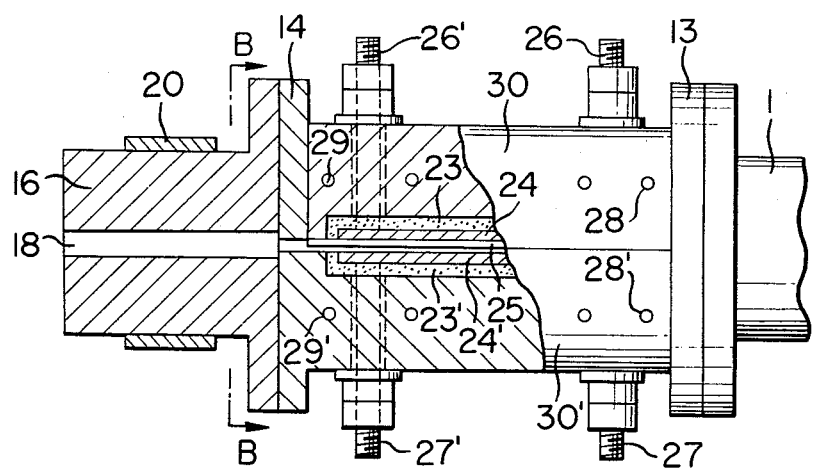
FIG. 5 is a fragmentary side sectional view of further another embodiment of the apparatus according to the present invention.

FIG. 5 is a partially cutaway view illustrating the plate extrusion die (plate seating die) different from the above mentioned embodiment of the present invention, wherein reference numeral 30, 30' denote heating passage structures which are adhered to each other at the joined surface but may be separated readily on the occasion of necessity. And, grooves are formed respectively which communicate from one side to the opposite side on the joined surface between the structures 30 and 30', in which refractory electric insulating layers 23 and 23' are attached to the insides of said grooves respectively and further thin plate-like electric resistance heaters 24 and 24' are disposed on the upper surfaces of said grooves respectively. And, the resistance heaters 24 and 24' are fixed to the structures, which are insulated electrically from said heaters, by means of conductive screws 26, 26', 27 and 27' which connect with resistance heaters 24 and 24' at substantially both ends thereof and pass through structures 30 and 30'. And, a proper electric power is applied to resistance heaters 24 and 24' from a variable electric power source (not shown) installed outside of the above mentioned structures through the conductive screws 26, 26', 27 and 27'. The clearance created between the confronting resistance heaters 24 and 24' is utilized as a passage 25 through which the material passes. In this context, the above mentioned passage clearance is normally narrowed, for instance, to a degree of about 1 mm, thereby efficiently heating the material passing through while directly touching the resistance heaters 24 and 24'. It may be generally said that the narrower the said clearance of passage 25 is and the longer the passage is, the more superior the heating efficiency is, but it is preferable that the pressure drop of the material passing through the passage 25 should not be in excess of the allowable range. Moreover, the heating passage structures 30 and 30' are provided with a plurality of medium passages 28, 29, 28' and 29', wherein the medium temperature in the passages 28 and 28' is arranged to be substantially equal to the temperature of material (for instance 80° C.) injected from the side of injection apparatus, on the other hand the medium temperature in the passages 29 and 29' is arranged to be substantially equal to the temperature of the die land 16 (for instance 180° C.), thereby imparting a temperature gradient substantially identical with said temperature difference to structures 30 and 30'. This permits to rapidly establish thermal equilibrium between the material rubber passing through the heating passage 25 and the variable heating input, which is also seen from the case of aforesaid resistance heating tube 12.

Next, explanation will be made on the refractory electric insulating layers 23 and 23'. These layers 23 and 23' are refractory electric insulating coated layers obtained by flowing or coating refractory electric insulating materials, for instance, such as polyamideimido varnish, denatured polyester varnish, silicone varnish and the like, or may be refractory electric insulating layers obtained by ceramic-coating or enamel, glass-lining, etc. Moreover, the refractory electric insulating layers 23 and 23' may be replaced by those molded from silicon compounds.

Next, reference will be made to electric resistance heaters 24 and 24'. For that purpose there can be used for instance nickel-chrome alloy, iron-chrome-aluminum alloy and other commercially available electric resistance materials mainly in the form of thin sheet. In addition thereto, there can be likewise used common metal materials, which are not usually available for electric heating resistance materials, for instance, such as iron (steel), stainless steel and the like. The above mentioned materials can be used also in the form of wire, not to speak of the form of thin sheet, in the manner of disposing said wire in the heating passage 25 so as to become a resistance heater and passing the material while contacting directly the surfaces of heaters 24 and 24'.

Apart from this, it may be possible to heat the passing material through the thin layers formed by coating the surfaces of resistance heaters 24 and 24' with, for instance, fluorine resin, silicone resin, polyamide, ceramic or the like. The above thin layer is very effective in that it imports an electric insulating property, further reduces the resistance attending on the advance of material and still further improves the mold releasing property (non-tackiness) of material residue to be removed. The others are identical with those explained with reference to FIG. 1, and therefore the like symbols will be affixed to the corresponding parts for the purpose of detailed explanations thereon hereinafter.

Figure 6:
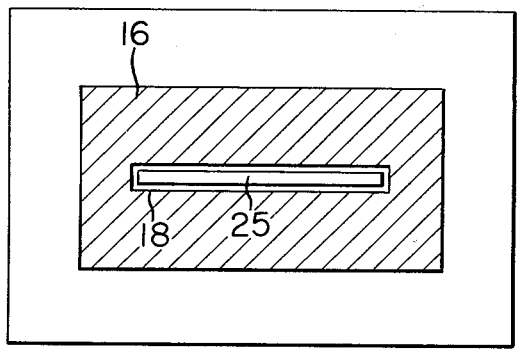
FIG. 6 is a sectional view taken on line B—B of FIG. 5.

FIG. 6 is an enlarged sectional view taken on line B—B of FIG. 5 in the direction of the arrow, wherein reference numeral 18 denotes the section of the die land and the heating passage outlet 25, which has a shape substantially identical with the sectional shape of the die land 18, opens in the passage of said die land.

According to the present apparatus, the whole quantity of material rubber flows through the resistance heating tube 12 without adhering to the tube wall, and consequently the material rubber flows at a fixed (variable) flow velocity always without causing any scorch within the tube and is fed to the die while being held at said desirably elevated temperature. The resistance heating tube 12 is capable of eliminating the rubber, vulcanized within the tube owing to mistaken regulation of heating electric power or the like, therefrom under an extrusion pressure and further sweeping said vulcanized rubber from within the die land to the outside. Due to this, the extrusion molding operation can be restored to its original good state by correcting the mistaken regulation of said heating input with no trouble of stopping the running of the extrusion apparatus.

In this connection, it is to be noted that the inlet 8' of the resistance heating tube 12 not only should be exclusively communicated with the especially modified passage 8 but also may of course be communicated directly with a special modification-free material passage, for instance, a normal adapter. Moreover, the resistance heating tube 12, which comprises arranging the outlets of a multiplicity of tubes having uniform or different calibers in the normal case (exceptionally there is a case where the tube number is singular or a few) optionally on the section of the die land which is at a sight angle to the direction of flow of the material, is applicable to the extrusion molding using not only aforesaid straight die, cross head die and plate extruding die but also different-shaped article extruding die (profile die), T die or the like.

The present invention can be utilized for the purpose of extrusion molding not only rubbers but also synthetic resins inducing thermal cross-linking reactions when molded, for instance, thermoplastic resins compounded with cross-linking agents or solid and liquid thermo-setting resins. Additionally, the present invention permits continuous molding of foaming bodies comprising rubbers and synthetic resins.

The present invention is very economical because it can reduce the energies to be consumed for extrusion molding by far in comparison with the conventional methods, and further is extremely profitable from the industrial viewpoint because the present apparatus can be produced cheaply.

What is claimed is:

1. A process of extrusion molding rubbers and synthetic resins which comprises the steps of discharging under pressure molding materials such as rubbers and synthetic resins, which undergo vulcanizing, cross linking or foaming reaction upon molding, by means of an extruder while adjusting said materials to a temperature range capable of neglecting the progress of said reaction contacting the materials from said extruder directly or through a filmy thin layer with a surface of an electric resistance heating body forming a narrowed heating passage; rapidly heating the materials by absorption of heat from said heating body up to a temperature capable of vulcanizing, cross-linking or foaming the material in a short time immediately before start of the reaction while maintaining thermal equilibrium between the materials passing through said heating passage and an amount of heat to be imparted thereto; instantly supplying the materials under pressure to a die; and maintaining the materials at the substantially same temperature as aforesaid temperature while the materials are passing through the die, thereby completing the reaction.

2. A process as set forth in claim 1 including the step of maintaining the materials at the same temperature at which they pass through the die for a while after passing through the outlet of the die.

3. An apparatus for extrusion molding rubbers and synthetic resins which comprises an extruder for discharging under pressure molding materials such as rubbers and synthetic resins, which undergo vulcanizing, cross linking or foaming reaction upon molding, while adjusting said materials to a temperature range capable of neglecting the progress of said reaction; a heating passage having a narrowed section formed of a plurality of annularly arranged tubular electric resistance heating bodies capable of rapidly heating the materials from the extruder by absorption of heat from said heating body up to a temperature capable of vulcanizing, cross-linking or foaming the material in a short time immediately before start of the reaction directly or through a filmy thin covering layer; a die connected with the heating passage and means for heating the die to the substantially same temperature as the heated molding materials.

4. An apparatus for extrusion molding rubbers and synthetic resins according to claim 3 further including a heating means adapted for maintaining the side of the heating passage structure contacting with the extruder at a temperature substantially equal to that of the extruder and the side of the heating passage structure contacting with the die at a temperature substantially equal to that of the die.

5. An apparatus as set forth in claim 3 wherein the body has an inside diameter of about 1.5 mm or less.

* * * * *